(12) United States Patent
Anderson et al.

(10) Patent No.: US 7,500,706 B2
(45) Date of Patent: Mar. 10, 2009

(54) TAILGATE SPRING ASSIST ASSEMBLY

(75) Inventors: Ryan T. Anderson, Grand Rapids, MI (US); Glen R. Wilkinson, III, Paw Paw, MI (US); Rainer Knapp, Oxford, MI (US); Paul N. Wise, Novi, MI (US)

(73) Assignee: Suspa Incorporated, Grand Rapids, MI (US)

( * ) Notice: Subject to any disclaimer, the term of this patent is extended or adjusted under 35 U.S.C. 154(b) by 0 days.

(21) Appl. No.: 11/687,182

(22) Filed: Mar. 16, 2007

(65) Prior Publication Data

US 2008/0224494 A1 Sep. 18, 2008

(51) Int. Cl.
*B62D 25/00* (2006.01)

(52) U.S. Cl. ........................................ 296/57.1; 296/50

(58) Field of Classification Search ................ 296/57.1, 296/50, 26.08, 52; 16/72, 75, 227, 308
See application file for complete search history.

(56) References Cited

U.S. PATENT DOCUMENTS

| | | | |
|---|---|---|---|
| 514,076 A | 2/1894 | Holz | |
| 766,411 A | 8/1904 | Bardsley | |
| 787,699 A | 4/1905 | Rosentreter | |
| 815,011 A | 3/1906 | Hanson | |
| 2,580,760 A | 1/1952 | Goodwin | |
| 3,734,560 A | 5/1973 | Cramblet | |
| 4,845,811 A * | 7/1989 | Fargnier | 16/308 |
| 4,905,347 A * | 3/1990 | Wroth | 16/308 |
| 5,039,154 A * | 8/1991 | Lewis | 296/52 |
| 5,085,555 A | 2/1992 | Vartanian | |
| 5,358,301 A * | 10/1994 | Konchan et al. | 16/308 |
| 5,857,738 A * | 1/1999 | Hamilton | 296/57.1 |
| 5,988,724 A * | 11/1999 | Wolda | 296/57.1 |
| 6,637,796 B1 * | 10/2003 | Westerdale et al. | 296/57.1 |
| 6,769,729 B1 * | 8/2004 | Bruford et al. | 296/50 |
| 6,773,047 B2 * | 8/2004 | Gruber | 296/57.1 |
| 6,793,263 B1 * | 9/2004 | Bruford et al. | 296/50 |
| 6,796,592 B1 * | 9/2004 | Austin | 296/57.1 |
| 6,820,910 B1 * | 11/2004 | Tan et al. | 296/57.1 |
| 6,820,920 B2 | 11/2004 | Maeda | |
| 6,832,801 B2 * | 12/2004 | Zagoroff | 296/57.1 |
| 6,846,030 B2 * | 1/2005 | Koehler et al. | 296/57.1 |
| 6,857,679 B2 * | 2/2005 | Zagaroff | 296/57.1 |
| 6,874,837 B2 * | 4/2005 | Bruford et al. | 296/50 |
| 6,905,156 B2 * | 6/2005 | Miller et al. | 296/50 |
| 6,976,723 B2 | 12/2005 | Libby | |
| 7,073,837 B2 | 7/2006 | Madlinger | |
| 7,093,876 B2 * | 8/2006 | Romig et al. | 296/50 |
| 7,128,295 B2 | 10/2006 | Scown | |

(Continued)

*Primary Examiner*—Kiran B. Patel
(74) *Attorney, Agent, or Firm*—Price, Heneveld, Cooper, DeWitt & Litton, LLP

(57) ABSTRACT

A spring assist raising assembly includes a pivot pin with a noncircular cross section which is mounted to either a pivoted panel, such as a tailgate, or a stationary member, such as a vehicle body adjacent the tailgate. A spring-loaded rotatable socket is rotatably mounted to the other of the panel or member section and is keyed to receive the pivot pin and rotate with the rotation of the tailgate by such interconnection. The socket is coupled to a spiral torsion spring, in one embodiment of the invention, such that, as the panel or tailgate is lowered, the spiral torsion spring is loaded to provide a restorative force for assisting in the raising of the panel or tailgate.

11 Claims, 3 Drawing Sheets

U.S. PATENT DOCUMENTS

| | | | |
|---|---|---|---|
| 7,156,441 B2 * | 1/2007 | Austin | 296/57.1 |
| 7,195,300 B2 * | 3/2007 | Austin | 296/57.1 |
| 7,213,857 B2 * | 5/2007 | Austin | 296/50 |
| 7,213,858 B2 * | 5/2007 | Smith | 296/57.1 |
| 7,243,977 B2 * | 7/2007 | McIntyre et al. | 16/308 |
| 7,281,746 B2 * | 10/2007 | Austin | 296/50 |
| 7,281,747 B2 * | 10/2007 | Austin | 296/50 |
| 7,287,799 B2 * | 10/2007 | Austin | 296/57.1 |
| 7,322,633 B2 * | 1/2008 | Zajicek et al. | 16/382 |
| 2005/0194808 A1 | 9/2005 | Austin | |
| 2005/0200150 A1 | 9/2005 | Austin | |
| 2006/0055197 A1 | 3/2006 | Austin | |
| 2006/0082181 A1 | 4/2006 | Austin | |
| 2006/0214454 A1 | 9/2006 | Austin | |
| 2006/0220409 A1 | 10/2006 | Smith | |
| 2006/0249343 A1 * | 11/2006 | Prottengeier et al. | 188/381 |
| 2007/0152471 A1 * | 7/2007 | Zagoroff | 296/57.1 |

* cited by examiner

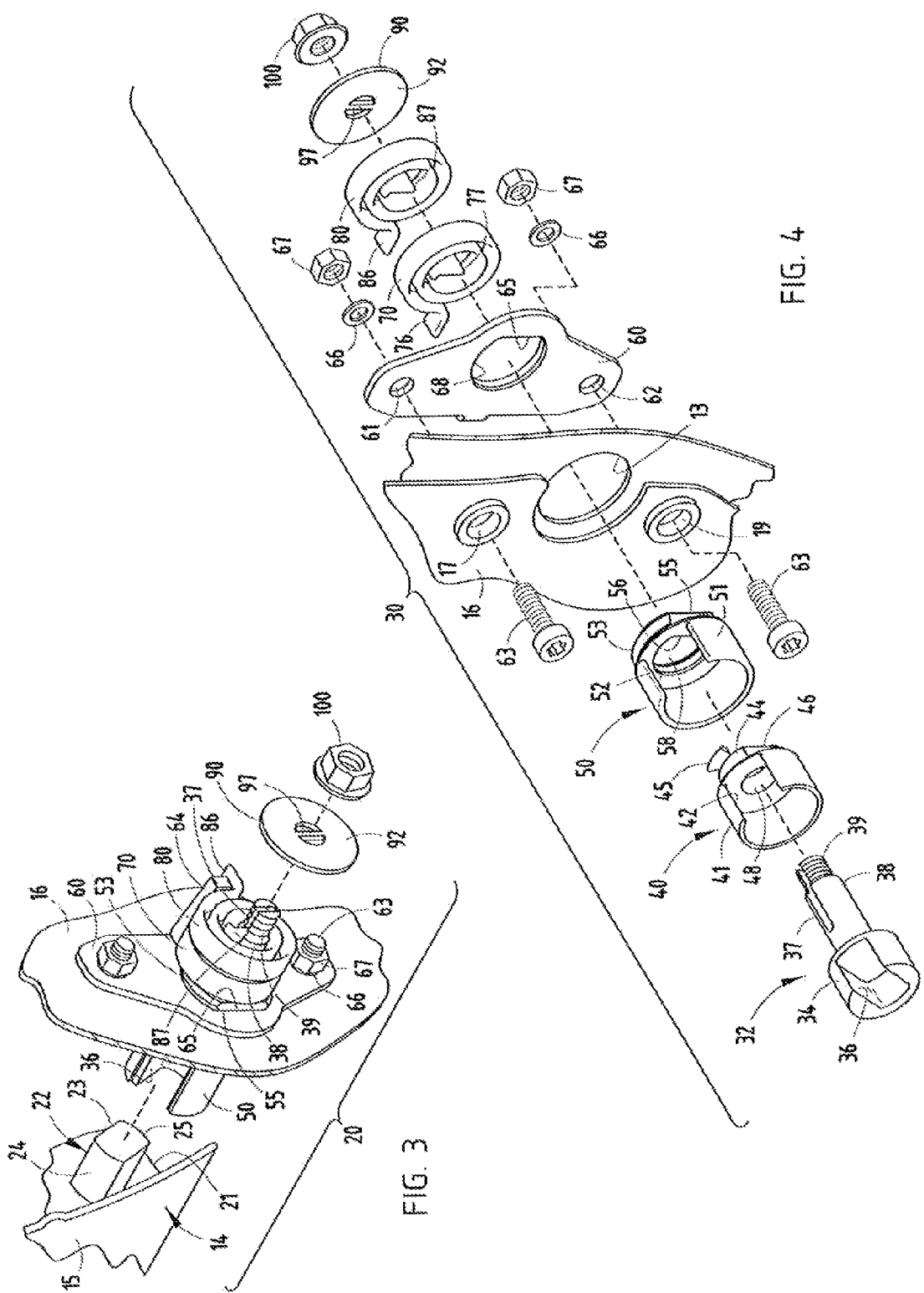

TAILGATE SPRING ASSIST ASSEMBLY

BACKGROUND OF THE INVENTION

The present invention relates to an assembly for assisting in the raising of a tailgate for a vehicle and specifically one employing a spring mechanism.

There have been a variety of suggestions for assisting in the raising of tailgates in vehicles, such as pickup trucks, sport utility vehicles, or vans, where tailgates can be relatively large and heavy, requiring considerable force to raise them from an open to a closed position. Prior efforts to facilitate the raising or tailgates have included a variety of torsion bars coupled between the vehicle body and tailgate, gas assist springs coupled between the body and the tailgate, and spring and/or lever mechanisms which couple the tailgate to the body of the vehicle. In many cases, these members are exposed to the elements and subject to premature failure as a result. Also, many of these proposals provide mechanisms which are in an area which physically impedes access to the vehicle storage area when the tailgate is lowered. Many tailgates can be removed by tilting and lifting from the vehicle body and several such prior art tailgate lift assist mechanisms prevent such easy removal.

Thus, there remains a need for a tailgate raising assist mechanism which is robust, does not interfere with access to the vehicle storage area, and which can be protected from environmental conditions.

SUMMARY OF THE INVENTION

A spring assist raising assembly of the present invention satisfies this need by providing a pivot pin with a noncircular cross section which is mounted to either a pivoted panel, such as a tailgate, or a stationary member, such as a vehicle body adjacent the tailgate, and a spring-loaded rotatable socket which is rotatably mounted to the other of the panel or member section. The socket is keyed to receive the pivot pin and rotate with the rotation of the tailgate by such interconnection. The socket is coupled to a spiral torsion spring, in one embodiment of the invention, such that, as the panel or tailgate is lowered, the spiral torsion spring is loaded to provide a restorative force for assisting in the raising of the panel or tailgate.

In one embodiment of the invention, the pivot pin is substantially rectangular and is mounted to the tailgate. The socket includes a slot for receiving the pivot pin and is rotatably mounted by an axle through the body section of the vehicle with spiral torsion springs fixedly secured to the vehicle in an area protected from environmental conditions on a side of the vehicle panel opposite the tailgate. In a preferred embodiment of the invention, the tailgate lift assist assembly includes a mounting plate with a tab extending therefrom for engaging an end of at least one spiral torsion spring and a socket having an axle extending through a cylindrical polymeric bushing and cylindrical support cup, each having slots aligned for receiving the pivot pin of a tailgate. The axle of the support socket extends through the bushing and support cup, which is lockably keyed to the mounting plate with the axle having a slot axially formed therein for engaging a tab on the spring opposite the first named tab, such that rotation of the socket loads the spring when lowering the tailgate. A keyed washer extends over the end of the axle, which is secured by a threaded nut, for mounting the spring-loaded rotatable socket to the vehicle body.

The assembly can be mounted in an enclosed area of the vehicle body between the outer fender and the body section adjacent the tailgate, such that the spring mechanism is enclosed and sealed from moisture, road salt, and the like, thereby extending the life of the mechanism. By providing slots in the sides of the bushing and support cup, when the tailgate is rotated to approximately 30° angle from vertical, the pivot pin aligns with the slots and allows the tailgate to be lifted from the spring-loaded socket for easy removal of the tailgate. The assembly can be installed as original equipment or retrofitted to existing vehicles.

These and other features, objects and advantages of the present invention will become apparent upon reading the following description thereof together with reference to the accompanying drawings.

BRIEF DESCRIPTION OF THE DRAWINGS

FIG. 3 is a fragmentary, perspective, exploded view of the assembly shown in FIG. 2 from a side opposite that shown in FIG. 2;

FIG. 4 is an exploded, fragmentary, perspective view of the spring-loaded socket assembly;

DETAILED DESCRIPTION OF THE PREFERRED EMBODIMENT

Figure 1:
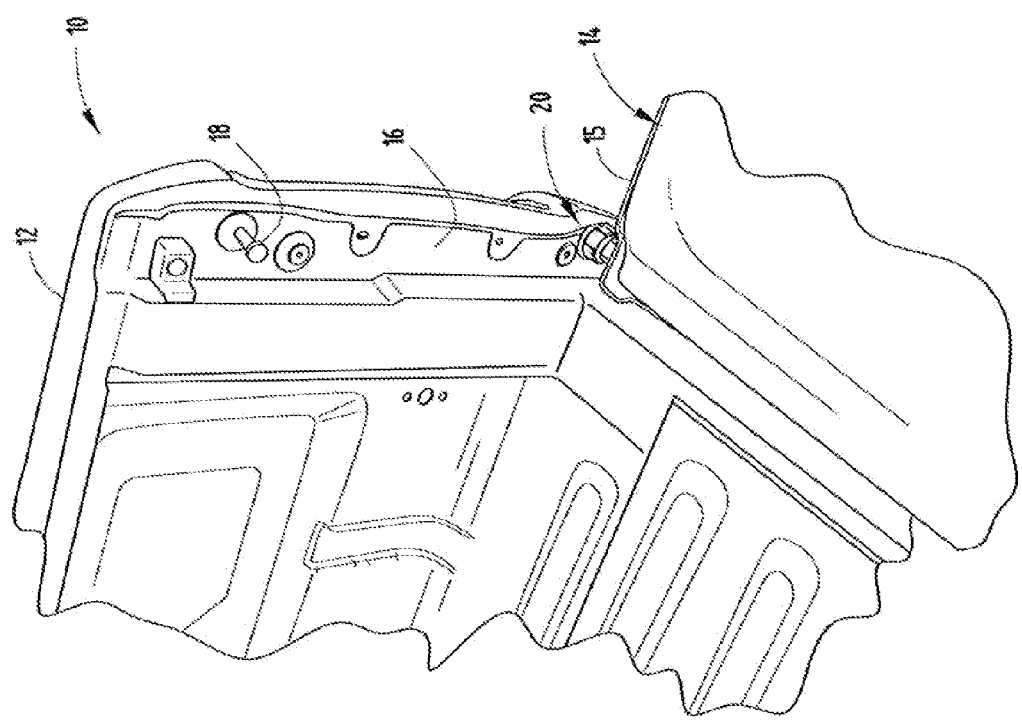
FIG. 1 is a fragmentary perspective view of a vehicle having a tailgate incorporating the lift assist assembly of the present invention.

Referring initially to FIG. 1, there is shown a preferred embodiment of the invention in the application for a vehicle 10, such as a pickup truck, having a body 12 and a tailgate 14 pivotally mounted to a body section 16 adjacent the edge 15 of tailgate 14. Although the vehicle illustrated is a pickup truck, other vehicles including tailgates, including but not limited to sport utility vehicles, vans, or other applications where a heavy panel must be raised from one position to another, can benefit from the tailgate assist mechanism of the present invention.

Vehicle body section 16 typically includes a latch pin 18 for latching the tailgate in a secure closed position when raised and frequently a stop cable (not shown) is coupled between the tailgate and the side wall section 16 of the vehicle to limit the excursion of the tailgate in a lowered position. Tailgate 14 is typically pivoted to the body of the vehicle at opposite lower corners, with the right end being shown and including the assist assembly 20 of the present invention. It is understood that the assembly of the present invention may be employed on both sides of tailgate 14 or the corner opposite assembly 20 may include a simple pivot axle and socket which, upon rotating the tailgate to a predetermined position and tilting, allows removal of the tailgate once the cable(s) has been disconnected.

Figure 2:
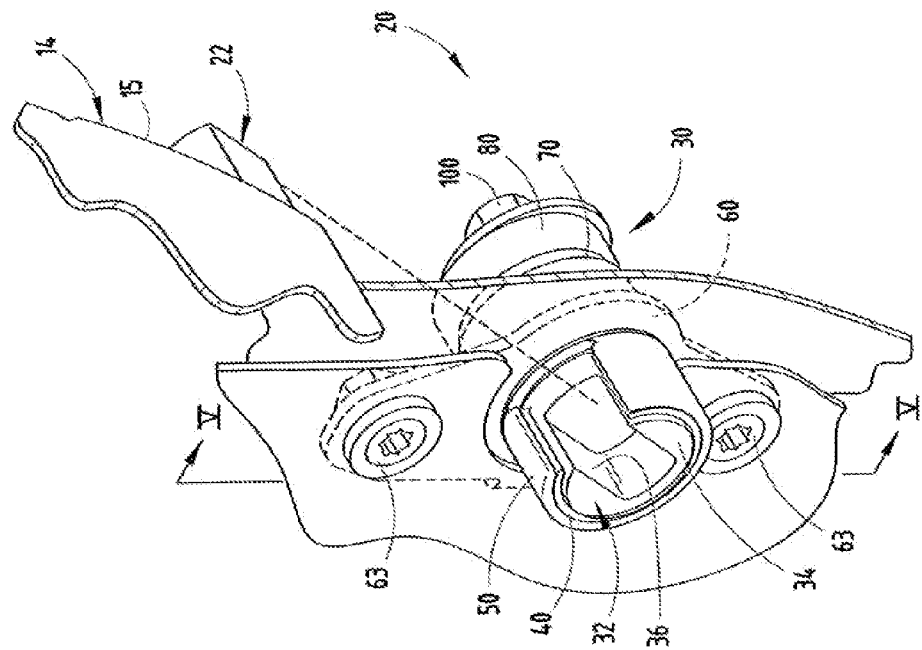
FIG. 2 is a fragmentary, exploded, perspective view of the tailgate and vehicle body showing the pivot pin in position for insertion into the rotated spring-loaded socket mounted to the vehicle body.
Figure 6:
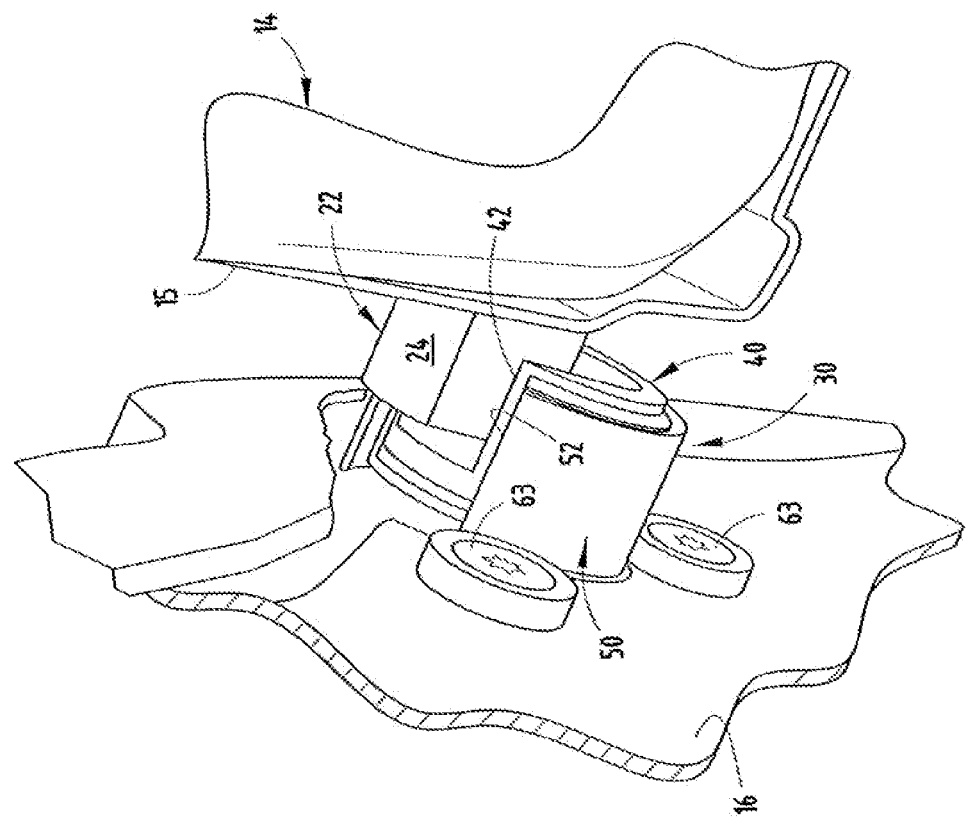
FIG. 6 is a fragmentary perspective view also illustrating the insertion of the pivot pin of the tailgate into the socket mounted to the vehicle body.
Figure 5:
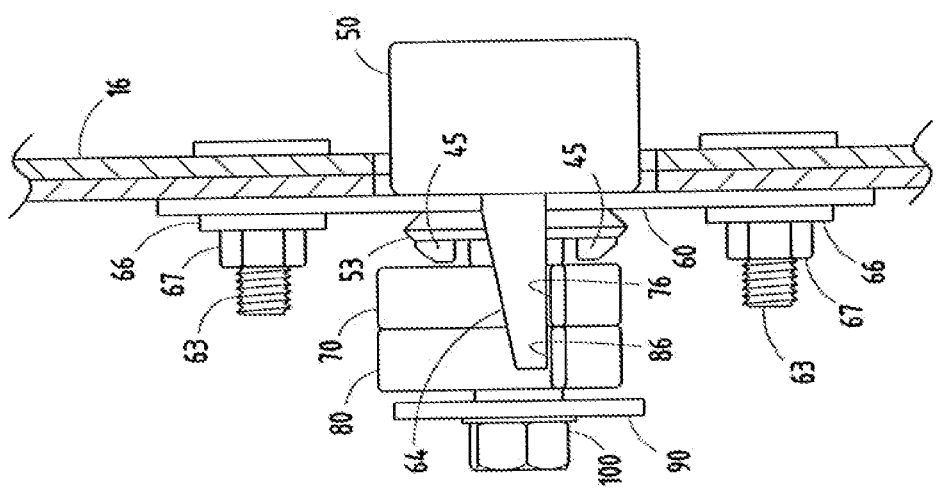
FIG. 5 is a cross-sectional view of the assembly shown in FIG. 2 taken along section lines V-V of FIG. 2.

Assembly 20 of the present invention includes, as best seen in FIGS. 2-6, a keyed rotatable socket assembly 30 and a pivot pin 22. The pivot pin can be mounted to the edge 15 of tailgate 16 in the preferred embodiment and the keyed socket assembly 30 mounted to the side panel 16 of the vehicle body, as illustrated. Alternately, the mounting arrangement can be reversed with the pivoted socket assembly 30 mounted within the tailgate and the pivot pin 22 mounted to the vehicle body. The pivot pin 22 is stationary and noncircular in cross section and, as seen in FIGS. 2, 3, and 6, comprises a generally rectangular member having flat opposed sides 21 and 23 and arcuate curved opposed connecting sides 24 and 25 conforming to the curvature of the socket of assembly 30. Pin 22 can be welded to the edge 15 of the tailgate using, if necessary, a reinforcing plate or it may be mounted by other conventional means using threaded features. It should be angularly positioned, however, to align with the socket 30, as illustrated in FIGS. 2, 3, and 6.

Socket assembly 30 comprises, as best seen in FIG. 4, a metal socket 32 having a cylindrical head 34 with a slot 36 formed therein conforming to the width of pivot pin 22, such that side walls 21 and 23 fit adjacent the edges of slot 36. Head 34 is integral with an axle 38 having an axially extending slot 37 formed therein. The end of axle 38 is threaded at 39 for securing the socket 32 to the vehicle body as described below. The axle 38 extends through an aperture 48 in a polymeric cylindrical bushing 40 having a slot 42 formed in side wall 41 having dimensions slightly larger than the width of the pivot pin 22 for admission of the pivot pin therein as illustrated in FIG. 6. The polymeric bushing has a cylindrical extension 44 with a flat 46 which extends through aperture 58 in metal support cup 50 with flat 46 engaging flat 56 of cup 50 to prevent rotation of bushing 40 with respect to cup 50. The axle 38 is rotatably supported within aperture 48 of bushing 40. Bushing 40 includes a pair of deflectable snap-in tabs 45 (FIGS. 4 and 5) for snap-fitting the bushing into metal support cup 50. Cup 50 has a side wall 51 with a slot 52 aligned with slot 42 of bushing 40 for the admission of the pivot pin 22. The support cup or collar 50 includes an annular extension 53 having a flat 55 formed thereon for keying the collar in fixed relationship to a mounting plate 60 having a generally circular aperture 68 with a flat 65 formed thereon for locking the collar 50 against rotation with respect to the mounting plate 60. Mounting plate 60 includes apertures 61 and 62 for securing the mounting plate to side wall 16 of vehicle body 12 by means of fasteners 63, which extend through apertures 17 and 19 in side wall 16 and secured to the side of panel 16 opposite the tailgate by means of lock washers 66 and threaded nuts 67.

Axle 38 of socket 32 extends through the circular aperture 13 in panel 16 through apertures 48, 58, and 68 in the bushing support cup and mounting plate with slot 37 receiving tabs 77 and 87 on spiral torsion springs 70 and 80, respectively. The spiral torsion springs include an opposite outer tab 76 and 86 which engage a stop tab 64 bent at right angles from mounting plate, as best seen in FIG. 3. This allows the springs to load as the tailgate rotates socket 32 from a raised to a lowered position tensioning the springs. Socket 32 is held within the body of the vehicle by a keyed washer 90 having a circular aperture 92 with a partition rib 97 therein which extends within slot 37 of socket 32. A locking nut 100 is threaded over the threaded end 39 of axle 38 for completing the assembly, as illustrated in FIGS. 1, 2, 5, and 6. The length of axle 38 and the depth of slot 37 is selected such that the tabs 77 and 87 of springs 70 and 80 fit within slot 37, and, as seen in FIG. 3, the threaded end 39 extends sufficiently beyond springs 70 and 80 to allow the washer 90 to be positioned thereover and lock nut 100 to secure the assembly together. In the embodiment shown, two springs 70 and 80 are employed, although in some embodiments, a single spring may be desired. The dual spring arrangement allows for optimization of design flexibility to provide the approximately 50 Newton meters lifting force provided by the spring assist mechanism 20. Each spring 70, 80, therefore, contributes about 25 Newton meters.

In the mounting plate 60, apertures 68 and flat 65, together with cup 50 and bushing 40 are oriented, as seen in FIG. 2, at an angle of approximately 30° from the vertical axis of the vehicle body such, when the tailgate is tilted downwardly approximately 30°, the pivot pin 22 can be removed through the slots 42 and 52 of the assembly. This allows removal of the tailgate from the vehicle body and when desired for hauling particular types of loads or when replacing the tailgate with, for example, a mesh net or other accessory. This position is the neutral position for assembly 20 in which the springs 70, 80 provide no torque to pin 22 through socket 32.

In operation, tailgate 14 is inserted into the slot of the assembly 30, as shown in FIGS. 2, 3, and 6, at the approximately 30° from vertical angle. Once inserted in the slot, the tailgate can be latched to a vertically closed position or lowered. In the position shown in FIGS. 2 and 6, springs 70 and 80 are substantially neutral, however, as the tailgate is lowered, the springs are loaded in a clockwise direction (as viewed in FIG. 4) by the rotation of socket 32 within bushing 40 coupled to the keyed pivot pin 22. The tabs 76 and 86 are held in fixed engagement with stop 64 of mounting plate 60 to allow the springs to load as the tailgate is lowered to a generally horizontal position. In this position, the spiral torsion springs provide a restorative force against the socket 32 and pivot pin 22 positioned therein, which assists in the subsequent raising of the tailgate. As the tailgate is rotated downwardly, the notch 36 in socket 32 and the pivot pin 22 are enclosed within cup 50 and bushing 40 (i.e., slots 42, 52 no longer align with notch 36) by the side walls 51 and 41 to prevent removal of the tailgate when in a lowered position from that shown in FIGS. 2 and 6 or when in a vertical position. Thus, the tailgate assist assembly of the present invention provides a compact, easily operated mechanism by which a tailgate can be readily removed from the vehicle, if desired, and one which is robust and provides protection against moving components without obstructing access to the storage area of the vehicle. The socket assembly 30 may be mounted within the tailgate 14 with a fixed pivot pin being mounted to the body section 16 if desired, although the drawings illustrate the preferred embodiment of the invention. Also, the assembly 20 may be employed in other applications where a relatively heavy panel is pivoted between lowered and raised positions.

These and various modifications to the preferred embodiment of the invention as described herein can be made by those skilled in the art without departing from the spirit or scope of the invention as defined by the appended claims.

The invention claimed is:

1. A spring assist assembly for a vehicle which includes a pivoted tailgate having a side, said vehicle having a body section adjacent the side of the tailgate, said assembly comprising:
   a pivot pin having a noncircular cross section mounted to one of the sides of the tailgate and the body section for pivotally coupling the tailgate to the body;
   a spring-loaded socket having a slot shaped for receiving said pivot pin, said socket rotatably mounted to the other of the tailgate and body section to be rotated by said pivot pin when the tailgate is rotated; and
   at least one spiral torsion spring coupled to one of said socket and pivot pin such that when the tailgate is lowered and said pivot pin rotates, said spring is loaded to provide a force for rotating the tailgate in an opposite direction to assist in raising the tailgate.

2. The assembly as defined in claim 1 wherein said socket is coupled to an axle for rotatably coupling said socket to one of the tailgate and body.

3. The assembly as defined in claim 2 wherein said spiral torsion spring is coupled to said axle.

4. The assembly as defined in claim 3 and further including a mounting bracket fixedly mounted to one of the tailgate and body section and to said spring such that said spring is loaded when the panel is lowered.

5. The assembly as defined in claim 4 and further including a support cup fixedly mounted to said mounting bracket and surrounding said socket, said cup having a slot in a side thereof to allow said pivot pin to engage said slot of said socket when the tailgate is in a predetermined rotated position.

6. The assembly as defined in claim 5 and further including a cup-shaped polymeric bushing extending between said socket and axle and said support cup.

7. The assembly as defined in claim 4 and further including a support cup fixedly mounted to said mounting bracket and surrounding said socket, said cup having a slot in a side thereof to allow said pivot pin to engage said slot of said socket when the tailgate is in a predetermined rotated position.

8. The assembly as defined in claim 7 and further including a cup-shaped polymeric bushing extending between said socket and said support cup.

9. The assembly as defined in claim 8 wherein said bushing includes an axial extension with a flat and said support cup includes an aperture with a flat which engages said flat of said bushing to prevent rotation of said bushing with respect to said support cup.

10. The assembly as defined in claim 9 wherein said mounting plate includes a tab which engages said second tab of said spiral torsion spring.

11. The assembly as defined in claim 10 wherein said support cup includes an axial extension having a flat on a side thereof and said mounting plate has an aperture which receives said axial extension of said support cup and includes a flat engaging said flat on said support cup for preventing rotation of said support cup with respect to said mounting plate.

* * * * *